(12) United States Patent
Aoki

(10) Patent No.: US 7,512,877 B2
(45) Date of Patent: Mar. 31, 2009

(54) CREATING DATA AND VOICE WEBPAGES WITH A FAX MACHINE THAT ALLOWS A USER TO SELECT TEMPLATE NAMES FROM A LIST OF TEMPLATES

(75) Inventor: Kazuma Aoki, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 333 days.

(21) Appl. No.: 10/254,795

(22) Filed: Sep. 26, 2002

(65) Prior Publication Data
US 2003/0061569 A1 Mar. 27, 2003

(30) Foreign Application Priority Data
Sep. 27, 2001 (JP) ............................. 2001-295824

(51) Int. Cl.
*G06F 15/00* (2006.01)
(52) U.S. Cl. ........................................ 715/234; 382/312
(58) Field of Classification Search ................. 715/517, 715/500.1, 513, 515, 205, 234, 760, 501.1; 382/312–319
See application file for complete search history.

(56) References Cited

U.S. PATENT DOCUMENTS 5,848,413 A * 12/1998 Wolff ........................... 707/10
6,161,124 A * 12/2000 Takagawa et al. ............ 709/203
6,684,369 B1 * 1/2004 Bernardo et al. ............. 715/513
2003/0187925 A1 * 10/2003 Inala et al. ................... 709/204
2004/0015476 A1 * 1/2004 Twaddle ......................... 707/1

FOREIGN PATENT DOCUMENTS

JP          3059894        4/1999
JP       2000-125069       4/2000

* cited by examiner

*Primary Examiner*—Cesar B Paula
(74) *Attorney, Agent, or Firm*—Oliff & Berridge, PLC

(57) ABSTRACT

A communication system includes a server and a facsimile machine. The server includes templates and provides a Web page creation service. The facsimile machine communicates with the server and includes input and output units to input and output text, images, and voice messages. When a creation of a Web page is requested from the facsimile machine to the server, a user is prompted to input text, images, and voice messages to be embedded in a template via a display unit of the facsimile machine. The text, images and voice messages input accordingly are sent to the server as input data, and embedded in the template to complete a Web page on the server.

13 Claims, 10 Drawing Sheets

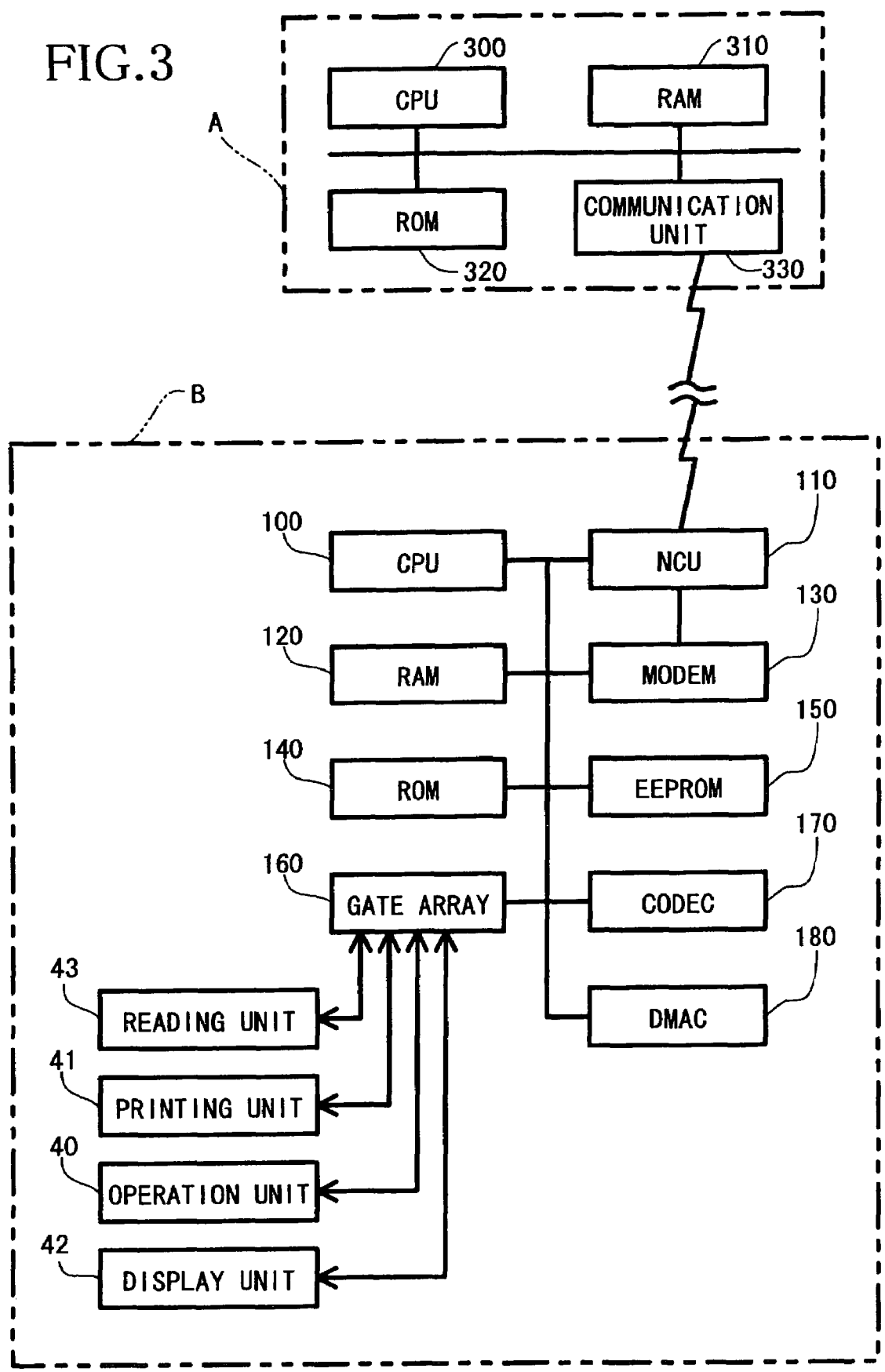

FIG. 4

```
<HTML>
<HEAD>
    <TITLE><!INPUT arg="NAME"></TITLE>
    <!TEMPLATE-ID name="SELF-INTRODUCTION" id="830291837462">
    <!INPUT-CMD arg="NAME" type="TEXT" guidance="./name.gd">
    <!INPUT-CMD arg="BIRTHDAY" type="TEXT" guidance="./birthday.gd">
    <!INPUT-CMD arg="FAMILY" type="TEXT" guidance="./family.gd">
    <!INPUT-CMD arg="SPECIALTY" type="TEXT" guidance="./specialy.gd">
    <!INPUT-CMD arg="COMMENT" type="TEXT" guidance="./comment.gd">
    <!INPUT-CMD arg="PHOTO" type="IMAGE" guidance="./photo.gd">
    <!INPUT-CMD arg="VOICE" type="AUDIO" guidance="./voice.gd">
</HEAD>
<BODY background=./background.gif bgcolor=#ffffff>
<H2 align=center>###NAME###</SMALL>PROFILE</H2>
<P align=center>
<TABLE width=480><TBODY>
    <TR vAlign=top>
        <TD><IMG height=240 src=
        <TD><TABLE><TBODY>
            <TR vAlign=top>
                <TD>BIRTHDAY </TD><TD>###BIRTHDAY###</TD></TR>
            <TR vAlign=top>
                <TD>FAMILY </TD><TD>###FAMILY###</TD></TR>
            <TR vAlign=top>
                <TD>SPECIALY </TD><TD>###SPECIALTY###</TD></TR>
            <TR vAlign=top>
                <TD>COMMENET </TD><TD>###COMMENT###</TD></TR>
            <TR vAlign=top>
                <TD>VOICE </TD><TD><A Href="###VOICE###">SELECT HERE</A></TD></TR>
        </TBODY></TABLE></TD></TR>
</TBODY></TABLE>
</P>
</BODY>
</HTML>
```

Annotations:

- name: TEMPLATE NAME
  id: TEMPLATE IDENTIFIER

- SCRIPT

- arg: VARIABLE NAME
  type: VARIABLE TYPE
  guidance: GUIDANCE DEFINITION FILE

- DESTINATION TO SUBSTITUTE VARIABLE REPRESENTED WITH VARIABLE PREFIXED AND SUFFIXED WITH "###"

- DATA TO BE SUBSTITUTED IN VARIABLE OF EACH TYPE
  TEXT: INPUT LETTER STRING
  IMAGE: INPUT IMAGE FILENAME
  AUDIO: INPUT VOICE FILENAME

FIG.7

NAME###PROFILE

PHOTO

BIRTHDAY ###BIRTHDAY###
FAMILY ###FAMILY###
SPECIALTY ###SPECIALTY###
COMMENT ###COMMENT###
MESSAGE SELECT HERE

| RETURN | | | SELECT |

FIG.8

DATA INPUT

READ PHOTO

PLACE PHOTO IN POSITION AND PRESS "READ"

| RETURN | | | READ |

FIG.9

DATA INPUT

INPUT YOUR NAME

PRESS "INPUT"

| RETURN | | INPUT | OK |

FIG.10

TEXT INPUT

あおき
AOKI

| 青木 AOKI | 青き AOKI | アオキ AOKI | 蒼き AOKI | 青樹 AOKI |

| RETURN | NONCONVERT | CONVERT | OK |

FIG.11

DATA INPUT

INTRODUCE YOURSELF

LIFT HANDSET AND PRESS "RECORD"

| RETURN | | RECORD | STOP |

FIG.12

PAGE PREVIEW

DO YOU WANT TO PREVIEW PAGE YOU CREATED?

| RETURN | YES | DELETE | REGISTER |

CREATING DATA AND VOICE WEBPAGES WITH A FAX MACHINE THAT ALLOWS A USER TO SELECT TEMPLATE NAMES FROM A LIST OF TEMPLATES

BACKGROUND OF THE INVENTION

1. Field of Invention

The invention relates to a communication system which supports the creation of Web pages mainly used on the Internet.

2. Description of Related Art

Recently, many individual users have opened their web sites containing various kinds of contents on the Internet. Web pages can be browsed not only on personal computers but also on facsimile machines and cellular phones that have Internet connection functions through the use of services called L-mode introduced by NTT-East and NTT-West and i-mode introduced by NTT DoCoMo.

On the contrary, to create a Web page, users have to have the expertise to operate applications designed specifically for Web page creation. Some of conventional facsimile machines have a function to browse Web pages and a function to create Web pages. However, it is not easy to create Web page on such facsimile machines.

SUMMARY OF THE INVENTION

The invention provides a communication system in which a Web page is easily created using a communication apparatus such as a facsimile machine and a cellular phone.

In one exemplary aspect of the invention, the communication system may include an information processing apparatus that has a specified template for Web page creation and supports Web page creation and a communication apparatus that exchanges various data with the information processing apparatus. The communication apparatus may include an input unit and an output unit to input and output at least one of text data, image data, and voice data, a Web page creation requesting unit that sends a request for Web page creation to the information processing apparatus and an input information sending unit that sends text data, image data, and/or voice data inputted, via the input unit, in response to messages from the information processing apparatus. The information processing apparatus may include an input information guiding unit that sends the messages to the communication apparatus indicating input information items to be embedded in the template in response to the request for a Web page from the communication apparatus and a Web page creating unit that embeds the text data, the image data, and/or the voice data in the template.

BRIEF DESCRIPTION OF THE DRAWINGS

An embodiment of the invention will be described in detail with reference to the following figures wherein:

FIG. 3 is a block diagram of general structures for a server and the facsimile machine;

FIG. 4 shows an example of a data structure of a template;

FIG. 7 shows an example of a screen display associated with the Web page creation;

FIG. 8 shows an example of a screen display associated with the Web page creation;

FIG. 9 shows an example of a screen display associated with the Web page creation;

FIG. 10 shows an example of a screen display associated with the Web page creation;

FIG. 11 shows an example of a screen display associated with the Web page creation;

FIG. 12 shows an example of a screen display associated with the Web page creation.

DETAILED DESCRIPTION OF PREFERRED EMBODIMENTS

A preferred embodiment of the invention will be described in detail with reference to the accompanying drawings.

Figure 1:
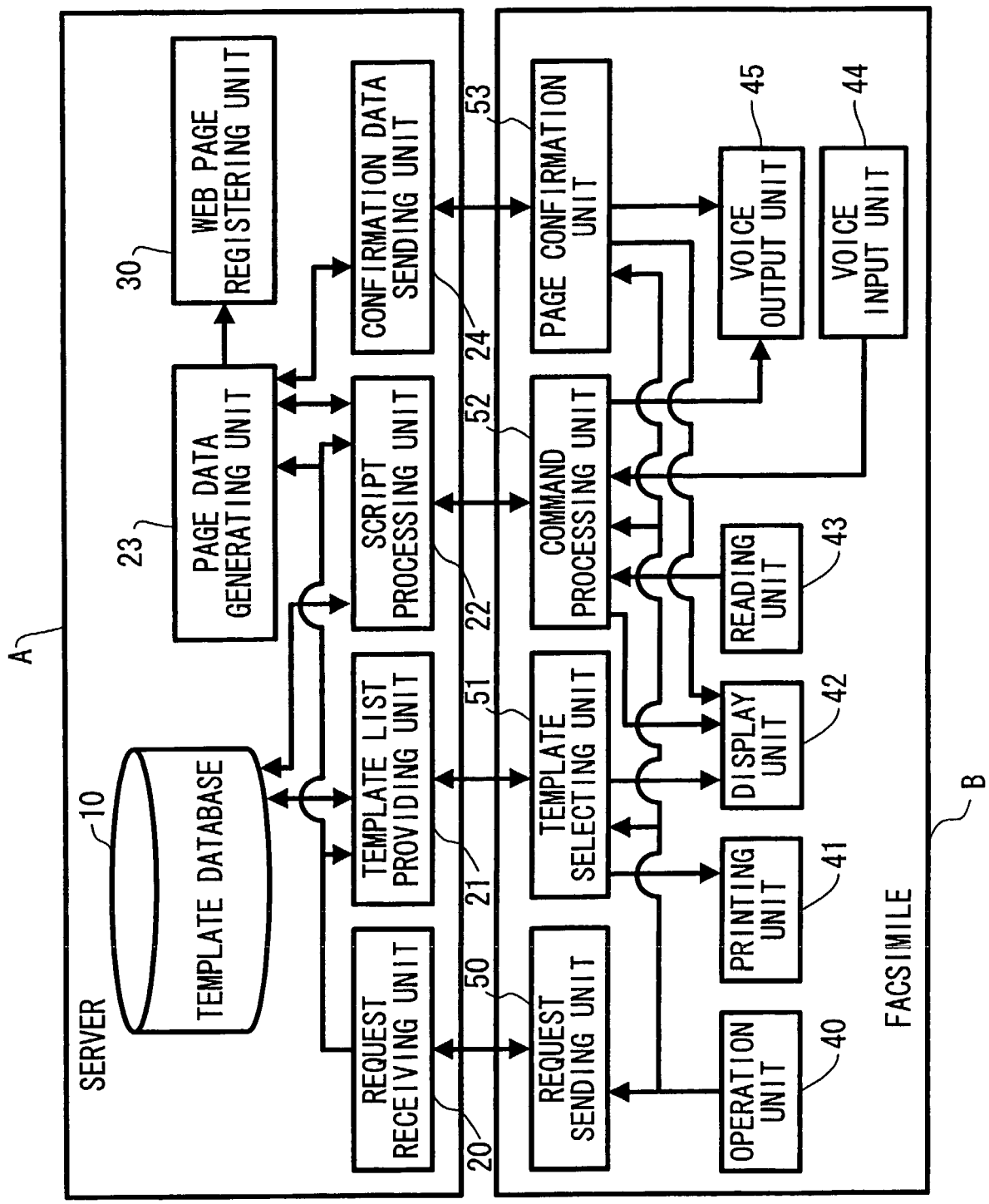
FIG. 1 is a block diagram conceptually showing a communication system according to an embodiment of the invention.
Figure 2:
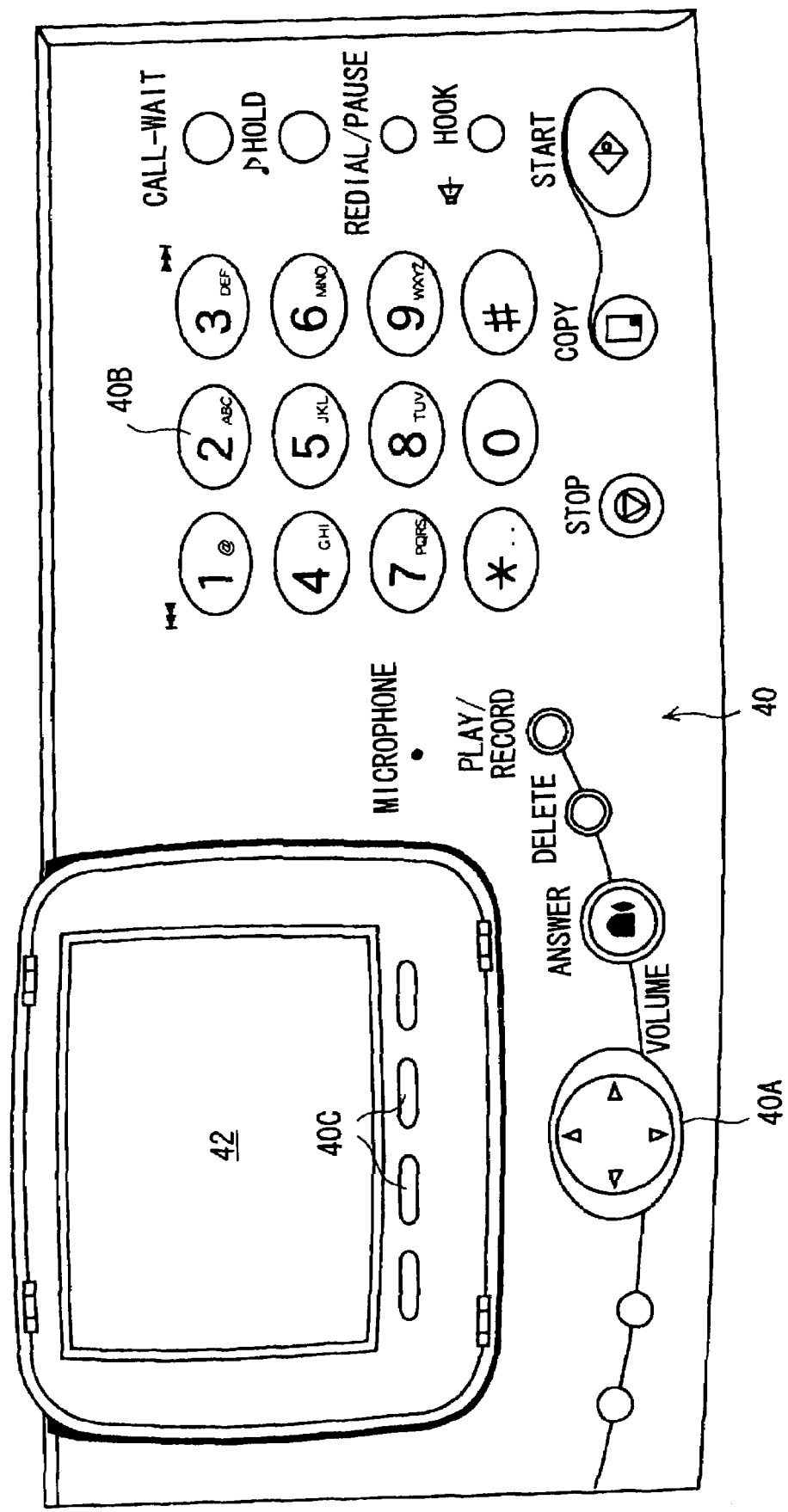
FIG. 2 is a plan view of a front panel of a facsimile machine.

FIG. 1 is a block diagram conceptually showing a communication system according to an embodiment of the invention. FIG. 2 is a plan view of a front panel of a facsimile machine. The communication system is made up of a server A as an information processing apparatus that is managed by an Internet service provider and a facsimile machine B that is able to the server A via the Internet. The server A is a computer provided with a transaction processing function designed for a Web browser preinstalled in the facsimile machine B as a client. The server A functionally includes a template database 10, a request receiving unit 20, a template list providing unit 21, a script processing unit 22, a page data generating unit 23, a confirmation data sending unit 24, and a Web page registration unit 30. The fax machine B has a microcomputer (not shown) as a control center, and is provided with a facsimile function and a telephone function which are performed via a telephone line, and a client function to view Web pages via the Internet. Such a facsimile machine B includes an operation unit 40, a printing unit 41, a display unit 42, a reading unit 43, a voice input unit 44, a voice output unit 45, a request sending unit 50, a template selection unit 51, a command processing unit 52, and a page confirmation unit 53.

FIG. 3 is a block diagram of general structures for a server and the facsimile machine. A CPU (central processing unit) 100 controls all operations of the facsimile machine B. A NCU (network control unit) 110 is connected to a public telephone line and perform network control. A RAM (random-access memory) 120 provides a workspace for the CPU 100 and is a storage area for various data. A modem 130 modulates or demodulates facsimile data. A ROM (read-only memory) 140 stores programs and data manipulated by the CPU 100. An EEPROM (electrically erasable programmable read only memory) 150 stores various kinds of flags and setting data. A gate array 160 functions as an interface between the CPU 100 and each unit. A CODEC (coder-decoder) 170 encodes or decodes facsimile data. A DMAC (duobinary multiplexed analogue component) 180 writes or reads data mainly to or from the RAM 120. A reading unit 43 includes an image sensor and an LED light source and reads an image from a copy. A printing unit 41 produces a print output by an electrographic method or an inkjet method. An operation unit 40 includes keys and switches including a numeric keypad, and transmits an instruction in accordance with an operation by a user to the CPU 100. A display unit 42 includes an LCD display, and displays various kinds of information. A CPU 300 of the server A controls all operations of the server A. A RAM 310 provides a workspace for the CPU 300 and is a storage area for various data. A ROM 320 stores programs for controlling input and output operations. A communication unit 330 conducts communications via the Internet. The following descriptions are made, for the most part, with reference to FIG. 1, which represents functions by the CPU 100 of the facsimile machine B and the CPU 300 of the server A.

The server A not only provides Web pages but also includes a function to support Web page creation. For Web page creation support, templates mainly consisting of Web page basic designs and scripts describing procedures to urge the client to input necessary data are prepared in the template database 10. Varieties of templates, which are divided into categories such as diary, self-introduction, travel, cooking recipe, and general information, are available. FIG. 4 shows a data structure of a template as an example. As shown in FIG. 4, a template is described in HTML (Hyper Text Markup Language), and its source is divided into a script part and a Web page part. In the script part, a template name indicating a type of template, and a template identifier given as a constant to call up the template are declared. In the script part, procedures to guide the client to input various data such as text, images, and voice messages are also described. The Web page part comes with text data, image data, and voice data input from the client. Specifically, each data is embedded in a character string assignment represented with a variable prefixed and suffixed with "###". The template database 10 stores guidance definition files used for guiding data input aside from templates.

The request receiving unit 20 receives a request for the creation of a Web page from the facsimile machine B as a client, and sends instructions to the template list providing unit 21, the script processing unit 22, and the page data generating unit 23 accordingly. The template list providing unit 21 reads templates from the template database 10, generates a list of templates, and provides it to the facsimile machine B. The script processing unit 22 executes a series of procedures based on a script described in a template, and captures data such as text data, image data, and voice data input from the facsimile machine B accordingly. The captured data is sent to the page data generating unit 23. The page data generating unit 23 embeds data obtained at the script processing unit 22 in character string assignments, and generates a Web page. The confirmation data sending unit 24 sends the Web page generated by the page data generating unit 23 as confirmation data to the facsimile machine B. The Web page registering unit 30 registers the Web page in the server A or a web server (not shown) in response to the facsimile machine B.

On the other hand, the facsimile machine B is provided with a function as a Web browser. The operation unit 40 transmits an instruction corresponding to an operation by an user to the request sending unit 50, the template selecting unit 51, the command processing unit 52, and the page confirmation unit 53. The operation unit 40 includes, as shown in FIG. 2, a cursor key 40A, a numeric keypad 40B, function keys 40C of which functions vary according to contents of the display unit 42, and other keys. The printing unit 41 prints images on paper based on an instruction from the operation unit 40. The display unit 42 displays various data. Specifically, Web pages as objects and various kinds of input selection screens accompanied with Web page creation are displayed on the display unit 42. The reading unit 43 scans images of a copy based on an instruction from the operation unit 40. The voice input unit 44 captures a voice through a handset with a built-in microphone. The voice output unit 45 outputs the voice via a speaker provided for the handset or machine body.

The request sending unit 50 issues a request for creating a Web page to the server A according to an instruction from the operation unit 40. The template selecting unit 51 receives a list of templates sent from the template list providing unit 21 of the server A and prompts a user to select a desired template. The command processing unit 52 receives a data input request from the script processing unit 22 of the server A, and sends the script processing unit 22 text data, image data, and voice data, which are input at the operation unit 40, the reading unit 43, the voice input unit 44 by the user. The page confirmation unit 53 receives a Web page as confirmation data from the confirmation data sending unit 24, and causes the display unit 42 to display the Web page or causes the printing unit 41 to print the Web page. This allows the user to confirm the contents of the Web page. When a determined registration operation is conducted, a command to register the Web page is sent to the server A via the page confirmation unit 53.

Next, operations of the communication system will be described.

Figure 5:
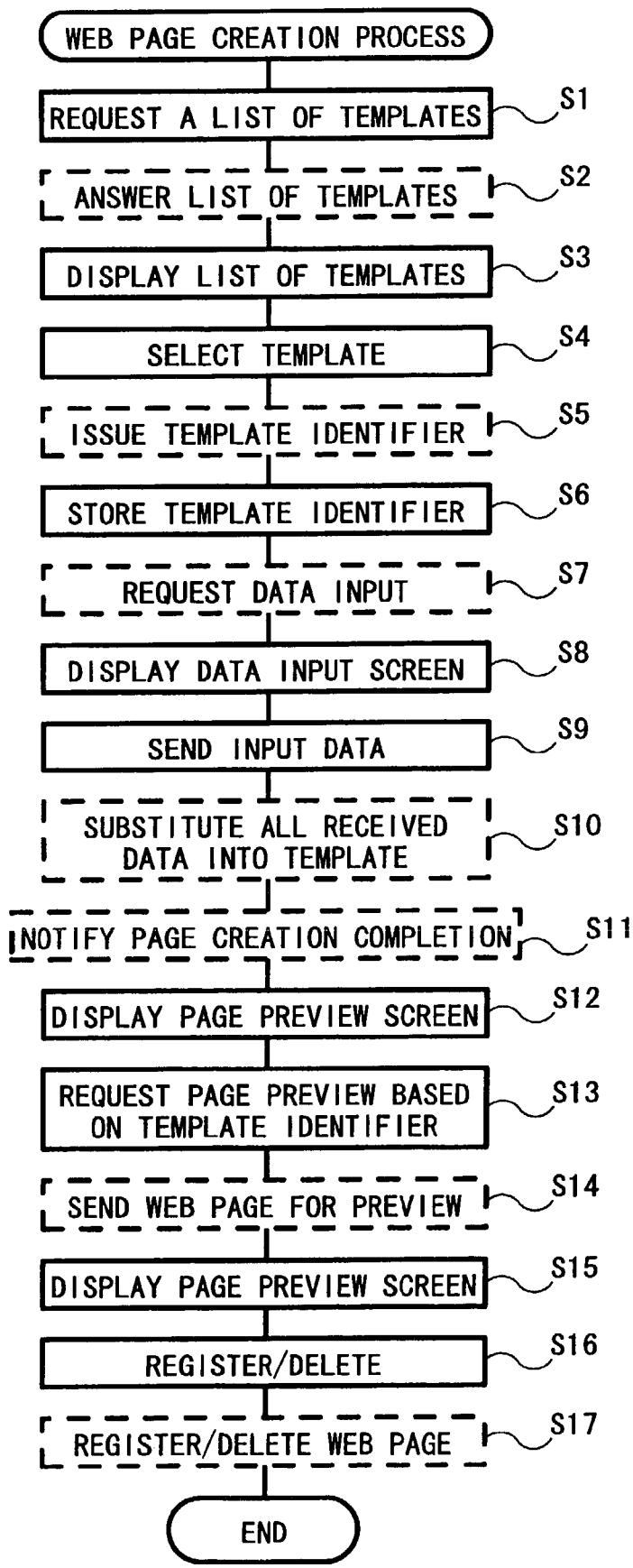
FIG. 5 is a flowchart showing a Web page creation process.

FIG. 5 is a flowchart showing a Web page creation process, and FIGS. 6 to 13 show examples of screens displayed associated with the Web page creation. In FIG. 5, a process indicated by a solid line is performed on the facsimile machine B, and a process indicated by a dashed line is performed on the server A. The facsimile machine B is connected to the server A via the Internet, and data exchange is conducted between the facsimile machine B and the server A based on a CGI (Common Gateway Interface) that is typically used on the Internet.

When a user of the facsimile machine B conducts a specified operation for creating a Web page via the operation unit 40, the facsimile machine B issues a command for requesting a list of templates to the server A (S1).

Accordingly, the server A calls up templates from the template database 10, creates template list information and answers it to the facsimile machine B (S2). The template list information includes a template name representing a template type, and a template identifier. Additionally, the template list information is stored so that it is displayable, for example, via a Web browser.

Figure 6:
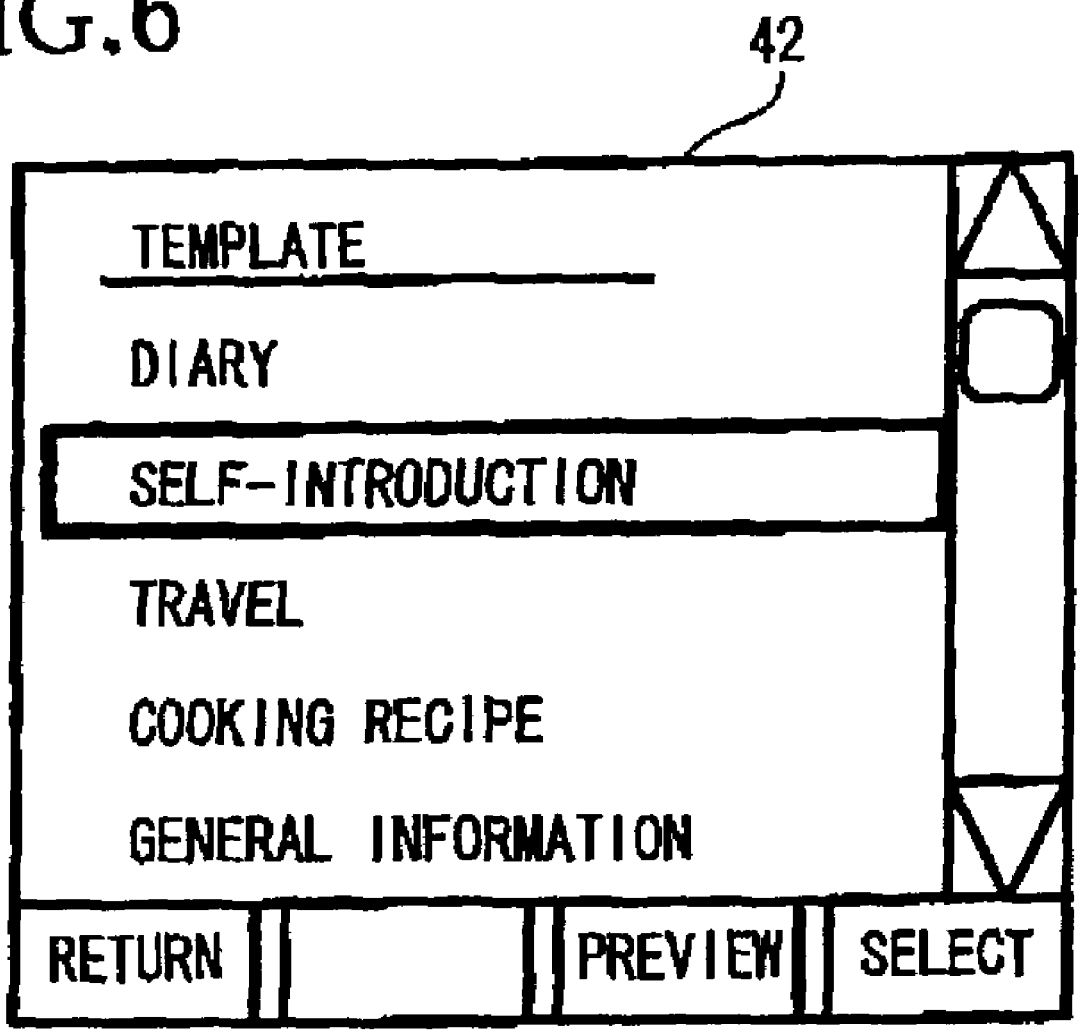
FIG. 6 shows an example of a screen display associated with the Web page creation.

When the facsimile machine B receives the template list information, the display unit 42 shows a list of templates (S3). As shown in FIG. 6, the list of templates includes five categories, "Diary", "Self-introduction", "Travel", "Cooking recipe", and "General information". With the operation of the cursor key 40A, a desired template (a "Self-introduction" template in this case) is selectable. When a function key 40C corresponding to "Preview" is pressed in FIG. 6, the display unit 42 shows the "Self-introduction" template, which is a Web page in which necessary data has not been input yet, as shown in FIG. 7.

On the facsimile machine B, when a function key 40C corresponding to "Select" is pressed in FIG. 7, the "Self-introduction" template is selected, and a request for creating a "Self-introduction" Web page is issued with the template identifier to the server A (S4).

The server A formally issues the template identifier, which is the base of the "Self-introduction" Web page, to the facsimile machine B (S5).

When the facsimile machine B receives the formal template identifier, the template identifier is stored in the memory (S6).

The server A requests the facsimile machine B to input data such as text data, image data, and voice data, which are necessary to be entered in the template, based on a script contained in the template (S7). To be more specific, guidance definition files to teach the user, using text and a voice, to input every item are called up, and sent to the facsimile machine B in order.

When the facsimile machine B receives the guidance definition files, a data input screen to guide the user to input necessary data appears on the display unit 42 (S8). As shown in FIG. 8, the user is requested to input a photo. The display unit 42 shows a message "Read photo" with an operation procedure. The photo can be read via the reading unit 43 by placing the photo in position and pressing a function key 40C corresponding to "Read". Then, the user is requested to input text for his/her name as shown in FIG. 9. When a function key 40C corresponding to "Input" is pressed in FIG. 9, a screen for inputting characters appears as shown in FIG. 10. The facsimile machine B is equipped with a Japanese word processor to display Japanese characters. As should be appreciated, the characters would be different for different countries and for different languages. For example, when "Aoki" (person's name) is typed in Japanese mode, Japanese character groups translated from "Aoki" are listed on the screen. When a desired character group is selected from the list and a function key 40C corresponding to "OK" is pressed, it is input. After inputting text, the user is requested to input a voice message for self-introduction as shown in FIG. 11. The display unit 42 shows a message "Introduce yourself" with an operation procedure. The voice message can be recorded via the voice input unit 44 by lifting the handset and pressing a function key 40C corresponding to "Record". Input screens including instruction messages such as "Read photo" are sent with the guidance definition files. Messages for operation procedures may be contained in the guidance definition files with the instruction messages or be prestored in the facsimile machine B. In addition, the instruction messages may be read by a voice synthesis function of the facsimile machine B.

The text, the image, and the voice message input as described above are sent, in order, from the facsimile machine B to the server A as input data (S9).

Receiving all input data sent from the facsimile machine B, the server A produces a copy of the template as a Web page, and substitutes the input data into specified character string assignments in the Web page (S10). At this time, text data is embedded in a string assignment corresponding to characters of the text, and image data and voice data are inserted into string assignments corresponding to filenames of an image file and a voice file. The image file and the voice file are separately created, saved and linked to the Web page.

When the Web page is completed as described above, the server A provides the facsimile machine B with a notification that the creation of the Web page has been completed (S11). At this time, the server A sends a page preview screen data in order for the user to preview the created Web page on the facsimile machine B.

When the facsimile machine B receives the page preview screen data, a page preview screen appears on the display unit 42 based on the page preview screen data (S12). For example, as shown in FIG. 12, a message "Do you want to preview page you created?" appears on the display unit 42.

When a function key 40C corresponding to "Yes" is pressed on the facsimile machine B in FIG. 12, the template identifier stored at S6 is issued to the server A with a command requesting the Web page preview (S13).

The server A receives the request for the Web page preview, identifies the created Web page based on the template identifier, and sends it as a Web page for preview to the facsimile machine B (S14).

Figure 13:
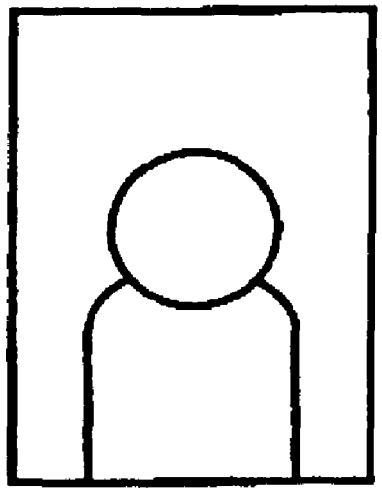
FIG. 13 shows an example of a screen display associated with the Web page creation.

When the facsimile machine B receives the Web page for preview, a page preview screen appears on the display unit 42 (S15). The contents of the page preview screen displayed at this time are exactly the Web page to be released on the Internet. As shown in FIG. 13, the display unit 42 shows a Web page in which necessary data has been embedded. For example, when a specified area is selected, a voice message stored in the server A as a voice file is called and sent to the facsimile machine B, so that the user can listen to the voice message.

Finally, when the user presses a function key 40C corresponding to "Register" with the page preview screen being displayed, a command to register the Web page is issued from the facsimile machine B to the server A (S16), the created Web page is registered in the server A (S17) in such a manner that the Web page can be viewed through the Internet. This completes the Web page creation process. Similarly, when the user presses a function key 40C corresponding to "Delete" with the page preview screen being displayed, a command to delete the Web page is issued from the facsimile machine B to the server A (S16), the created Web page is deleted on the server A side (S17), and this completes the Web page creation process.

In short, according to the above communication system, after the creation of the Web page is requested from the facsimile machine B to the server A, the user is requested to input text, an image(s), and a voice message(s) in an interactive manner on the facsimile machine B. All the user has to do is just to input data such as text, an image(s), and a voice message(s) following the instructions displayed on the display unit 42, and send it to the server A. The creation of a Web page can be completed by embedding input data sent from the facsimile machine B on the server A. In this manner, a Web page including text, images and voice messages can be easily created just through the use of existing functions the facsimile machine B has.

The facsimile machine B is controlled by a built-in microcomputer, and is not equipped with a hard disk and application programs. For this reason, it is impossible to create a Web page on the facsimile machine B alone. However, as described above, the facsimile machine B can exchange input data with the server A via the Internet. Therefore, by using the facsimile machine B for input operations, varieties of Web pages can be created.

The invention is not limited to the above embodiment.

Web pages may not include all of text, images, and voice messages. They can contain only one of them. Accordingly, templates may be prepared provided that they are designed so as to embed text, images, or voice messages alone therein.

In the above embodiment, the server A is a computer having a function to provide Web pages, however, it may be just a personal computer having a function as a client. In such a case, the personal computer may include a Web page creation support program, in which a Web page finally registered is forwarded from the personal computer to another server and released and viewed on the server.

When the facsimile machine B is equipped with a video capture terminal which is connectable to a video camera, the communication system can be configured in such a manner that not only text, images, and voice but also motion data can be input from the video camera and sent to the server A via the facsimile machine B. In such a case, Web pages including motion data can be created on the server A side.

It should be understood that the invention is not limited in its application to the details of structure and arrangement of parts illustrated in the accompanying drawings. The invention is capable of other embodiments and of being practiced or performed in various ways without departing from the technical idea thereof, based on existing and well-known techniques among those skilled in the art.

What is claimed is:

1. A communication system with an information processing apparatus that has a plurality of templates for Web page creation and supports Web page creation and a facsimile machine that exchanges various data with the information processing apparatus, the facsimile machine comprising:
- an input unit that inputs scanned image data and voice data;
- a Web page creation requesting unit that sends a request for Web page creation to display a Web page intended for public viewing on an internet to the information processing apparatus;
- an output unit that displays a list of templates using template names representing types of templates from the information processing apparatus, wherein a user is allowed to select a desired template from the list of templates using the input unit; and
- an input information sending unit that sends the information processing apparatus the scanned image data and voice data inputted, via the input unit, in response to messages from the information processing apparatus; and the information processing apparatus comprising:
- a Web page creation receiving unit that receives the request for Web page creation and creates the list of templates using template names representing types of templates from the plurality of templates and forwards the list of templates to the facsimile machine;
- an input information guiding unit that sends the messages to the facsimile machine indicating input information items to be embedded in the desired template selected by the user; and
- a Web page creating unit that embeds the scanned image data and voice data in the desired template, wherein:
  - the facsimile machine and the information processing apparatus are two separate devices, and
  - the Web page created by the information processing apparatus can be viewed from apparatuses that are accessible to the internet other than the facsimile machine and the information processing apparatus.

2. The communication system according to claim 1, wherein the input information items are predetermined inherently in each of the templates, and the Web page creating unit embeds received input information into the desired template in accordance with the input information items.

3. The communication system according to claim 2, wherein the information processing apparatus sends the Web page created by the Web page creating unit to the facsimile machine, and the facsimile machine displays the created Web page on the output unit.

4. The communication system according to claim 3, wherein the Web page creating unit registers a finished Web page.

5. The communication system according to claim 2, wherein the Web page creating unit registers a finished Web page.

6. A facsimile machine that can exchange various data with an information processing apparatus that includes a plurality of templates for Web page creation and supports Web page creation, the facsimile machine comprising:
- an input unit that inputs scanned image data and voice data;
- a Web page creation requesting unit that sends a request to the information processing apparatus for Web page creation to display a Web page intended for public viewing on an internet;
- an output unit that displays a list of templates using template names representing types of templates from the information processing apparatus, wherein a user is allowed to select a desired template from the list of templates using the input unit; and
- an input information sending unit that sends the scanned image data and voice data to be embedded in the desired template, via the input unit, to the information processing apparatus, wherein:
  - the facsimile machine and the information processing apparatus are two separate devices, and
  - the Web page created by the information processing apparatus can be viewed from apparatuses that are accessible to the internet other than the facsimile machine and the information processing apparatus.

7. The facsimile machine according to claim 6, wherein the information processing apparatus further includes an input information guiding unit that sends messages indicating input information items to be embedded in the desired template selected by the user to the facsimile machine, and the input information sending unit sends the scanned image data and voice data inputted, via the input unit, in response to the messages from the image processing apparatus.

8. A Web page creation support system, comprising:
an information processing apparatus that includes a data communication unit, the information processing apparatus comprising:
- a plurality of templates for Web page creation;
- a Web page creation receiving unit that receives a request for Web page creation and creates a list of templates using template names representing types of templates from the plurality of templates and forwards the list of templates to the facsimile machine;
- an input information guiding unit that provides messages indicating input information items to be embedded that are predetermined inherently in each of the templates; and a facsimile machine that communicates with the information processing apparatus, the facsimile machine comprising:
- a unit that requests Web page creation to display a Web page intended for public viewing on an internet to the information processing apparatus;
- an input unit that inputs scanned image data and voice data;
- an output unit that displays the list of templates using template names representing types of templates from the information processing apparatus, wherein a user is allowed to select a desired template from the list of templates using the input unit; and
- an input information sending unit that sends the scanned image data and voice data inputted, via the input unit, to the information processing apparatus, wherein:
  - the information processing apparatus sends the list of templates to the facsimile machine in response to the request for Web page creation from the facsimile machine,
  - the facsimile machine displays the list of templates on the output unit and the user is allowed to select the desired ternplate,
  - the scanned image data and voice data are inputted via the input unit to the information processing apparatus in response to the messages from the input information guiding unit, the information processing apparatus embeds the scanned image data and voice data from the input information sending unit in the desired template and completes the Web page, the facsimile machine and the information processing apparatus are two separate devices, and the Web page created by the information processing apparatus can be viewed from apparatuses that are accessible to the internet other than the facsimile machine and the information processing apparatus.

9. The Web page creation support system according to claim 8, wherein the facsimile machine displays the messages from the input information guiding unit on the output unit.

10. The Web page creation support system according to claim 9, wherein the information processing apparatus sends a Web page completed by the Web page creating unit to the facsimile machine, and the facsimile machine displays the completed Web page on the output unit.

11. A method of creating a Web page via data communication between a server and a facsimile machine, comprising the steps of:

providing the server with a plurality of templates for Web page creation;

issuing a signal requesting Web page creation to display a Web page intended for public viewing on an internet from the facsimile machine to the server;

receiving the request signal for Web page creation and creating a list of templates using template names representing types of templates from the plurality of templates and forwarding the list of templates from the server to the facsimile machine in response to the request signal;

providing the facsimile machine with a display unit;

displaying the list of templates using template names representing types of templates from the server, wherein a user is allowed to select a desired template from the list of templates using the input unit on the display unit;

sending messages indicating input information items to be embedded in a desired template from the server to the facsimile machine;

providing the facsimile machine with an input unit that inputs scanned image data and voice data in response to the messages;

sending the scanned image data and voice data inputted from the facsimile machine to the server; and embedding the scanned image data and voice data sent from the facsimile machine in the desired template on the server, wherein the Web page created by the server can be viewed from apparatuses that are accessible to the internet other than the facsimile machine and the server.

12. The method according to claim 11, further comprising the steps of:

sending the desired template in which data has been embedded from the server to the facsimile machine; and displaying the desired template on the display unit.

13. A computer program on a computer readable medium that controls a facsimile machine that can exchange various data with an information processing apparatus that includes a plurality of templates for Web page creation and supports the Web page creation, the computer program comprising:

a control program that controls an input unit that inputs scanned image data and voice data;

a Web page creation request program that requests the information processing apparatus to create a Web page intended for public viewing on an internet;

an output unit program that displays a list of templates using template names representing types of templates from the information processing apparatus, wherein a user is allowed to select a desired template from the list of templates using the input unit;

an input information guiding program that sends messages indicating input information items to be embedded in the desired template to the facsimile machine; and an input information sending program that sends the scanned image data and voice data to be embedded in the desired template inputted via the input unit to the information processing apparatus in response to the messages from the input information guiding program, wherein:

the facsimile machine and the information processing apparatus are two separate devices, and the Web page created by the information processing apparatus can be viewed from apparatuses that are accessible to the internet other than the facsimile machine and the information processing apparatus.

* * * * *